FIG. 1

INVENTOR.
DONALD H. ALLDRITT
THEODORE E. BEAM

ATTORNEY

INVENTOR.
DONALD H. ALLDRITT
THEODORE E. BEAM
BY
ATTORNEY

Nov. 11, 1969    D. H. ALLDRITT ETAL    3,478,342
METER READING MEANS AND METHOD
Filed Aug. 24, 1965    4 Sheets-Sheet 4

INVENTOR.
DONALD H. ALLDRITT
THEODORE E. BEAM
BY
*Robert E. Breidenthal*
ATTORNEY

United States Patent Office 3,478,342
Patented Nov. 11, 1969

3,478,342
METER READING MEANS AND METHOD
Donald H. Alldritt, 918 Central Bldg. 67202, and
Theodore E. Beam, 3333 E. Central 67218, both
of Wichita, Kans.
Filed Aug. 24, 1965, Ser. No. 482,164
Int. Cl. G08c 19/00; G01d 13/26
U.S. Cl. 340—194                                    7 Claims

ABSTRACT OF THE DISCLOSURE

The invention comprises the method of and apparatus for signaling the multi-digit numerical reading of a meter by producing a series of electrical signal pulses with the time position of a pulse in the series of pulses indicating the magnitude of the digit represented or indicated thereby. The method and apparatus is particularly applicable to the remote reading of utility meters, and in this application, each digit indicator (units, tens, etc.) has a normally open switch associated with each possible value to which such digit is susceptible. All such switches of each digit indicator are connected in parallel between a power source and a series of spaced stationary contacts of a master selector switch. The series of stationary contacts of the units indicator are sequentially in series with corresponding contacts of indicators of tens, hundreds, etc. The selector switch includes a movable contact connected to the power source and means is provided to sequentially contact the movable contact with all of the stationary contacts in a timed order. Means is provided for closing with respect to each digit indicator the switch thereof corresponding to the particular digit value indicated, whereby a circuit is completed and a pulse is produced as the movable contact contacts stationary contacts associated with a closed switch, whereby a single pulse is produced to indicate by its time position the value of the digit and also as to whether its multiplier is 10, 100, etc. Additional stationary contacts can be provided for contact by the movable contact to establish by pulses a time reference scale.

---

This invention relates to new and useful improvements in methods of and apparatus for ascertaining the readings of measuring instruments or devices from a remote location; and more particularly pertains to such methods and apparatus especially well suited to ascertaining at a central location and with respect to a plurality of utility customers, who may be remote from each other and who are remote from such location, the readings of one or more meters as to the cumulative amount of services or commodities (such as normally provided by public utilities—water, gas, electrical energy, etc.) that have been delivered to or consumed by each of the individual customers.

With greater specificity, the invention involves methods and apparatus whereby customer meter readings can be obtained at the central location of a data processing or data collecting center in the form of pulsed electrical signals generated at the site of or in the immediate vicinity of the meters being read, with such electrical signals being communicated between each of the customer's meters and the data processing or data collecting center via existing telephone facilities or communication links.

Indeed, while not in itself constituting inventive subject matter pre se of this invention, this invention preferably involves in its practice inventions heretofore made by others that are well known to those conversant with the telephone and closely allied arts, whereby a telephone link can be initiated at and caused to be established between special equipment or accessories (recorders, a programed computer, output devices for computers, etc.) at such first telephone and special accessory equipment (such as, for example, circuits and switching apparatus responsive to a special ringing signal to couple telephone lines to meter controlled signal generators, signal modulators, pulse shapers, etc.) at a second telephone selected from a plurality of telephones that could be similarly so selected. This invention is specially concerned with new and useful improvements in such special or accessory equipment coupled to such a second telephone and which special equipment or accessories of this invention are operatively coupled or linked to the first telephone upon the first telephone being actuated to select the second telephone and link their respective special equipments or accessories. While specially concerned with the special equipment or accessories at the second (customer's) telephone, the invention in its more comprehensive aspects involves the first telephone (at the data processing or collecting site), the special equipment or accessories thereat, the means for selecting a particular second telephone, and a plurality of second telephones in combination with the special equipments or accessories of the invention at the second telephones.

Also the present invention is concerned with methods of generating electrical signals for telephone transmission which are of informational value and can be interpreted to provide indication of the numerical values of meter readings.

Although the present invention does not deal specifically with details of data processing equipment (digital computers, programs therefor, and related equipment) any more than with details of measuring devices (other than the indicators thereof), it is of interest to note that the character of the electrical signals (that is the nature of the electrical encoding of meter reading information) is specially adapted for digital computer processing, and it is intended that the special equipment at the first telephone (the central and communication link initiating and establishing station) shall include a digital computer which can if desired be programmed to accept such signals directly as input upon such pulse reshaping or signal demodulation and pulse shaping as may be necessary or appropriate. It is also within the purview of the practice of this invention that such computer program cause the computer to control through output devices the sequential establishment of telephone links with and query of the meter reading (by initiating actuation of the special equipment of customer's telephones to which this invention is specially directed) of a plurality of customers.

A more complete understanding of the purposes and intended environments of use and modes of operation of the present invention will be obtained upon consideration of various means and methods of analogous prior art, and to this end attention is directed to the disclosures, incorporated herein by reference, of the following U.S. Patents:

U.S. Patent No. 1,889,597, entitled Telemetering Method and Apparatus, issued Nov. 29, 1932, to FitzGerald;

U.S. Patent No. 1,621,939, entitled Meter Reading Apparatus, issued Mar. 22, 1927, to Lowe;

U.S. Patent No. 1,897,657, entitled Metering System, issued Feb. 14, 1933, to Yates;

U.S. Patent No. 1,800,019, entitled Automatic Meter Reading Device, issued Apr. 7, 1931, to Hewit;

U.S. Patent No. 1,802,643, entitled Electrical Meter Reading System, issued Apr. 28, 1931, to Floyd.

U.S. Patent No. 1,919,922, entitled Impulse Storage Mechanism, issued July 25, 1933, to Stewart;

U.S. Patent No. 2,154,694, entitled Communication System, issued Apr. 18, 1939, to Pakala;

U.S. Patent No. 2,335,755, entitled Automatic Telemetering System, issued Nov. 30, 1943, to Haddad;

U.S. Patent No. 2,319,412, entitled Automatic Meter Reading Apparatus, issued May 18, 1943, to Leathers;

U.S. Patent No. 2,314,720, entitled Automatic Meter Reading Apparatus, issued Mar. 23, 1943, to Leathers;

U.S. Patent No. 2,285,819, entitled Automatic Meter-Reading Apparatus, issued June 9, 1942, to Leathers;

U.S. Patent No. 2,070,340, entitled Remote Metering and Service Control Apparatus, issued Feb. 9, 1937, to O'Bryan;

U.S. Patent No. 2,326,200, entitled Telemetric Apparatus, issued Aug. 10, 1943, to Bristol; and U.S. Patent No. 2,335,529, entitled Rotary Switch, issued Nov. 30, 1943, to Panissidi.

With the foregoing prior art as a background, the objects of this invention will be best understood.

The primary object of the invention is to provide apparatus which can be initiated in its cycle of operation through telephone facilities from a remote site which will encode numerical meter readings as pulse position electrical signals and transmit such signals to the remote site via such facilities.

Closely allied to the foregoing primary object is the very important object of providing a meter reading system which can include a computer programmed to query and obtain at a computing center meter readings through telephone circuits of remote metering devices at various locations, whereby the computer can with known programming techniques be further programmed to compute and produce an output suitable to control various output devices to perform such tasks as recording meter readings, appropriately addressing a preparing billing statements to customers and so forth, and whereby the human services of meter readers that presently actually visit customers' meters as well as those of central office personnel (bookkeepers, etc.) can be largely if not entirely dispensed with.

Another important object of this invention is to provide a method of encoding a multi-digit number in the form of pulse position electrical signal wherein the position of a pulse in a time interval indicates the value of a digit with the signal incorporating the digits of the number in an ordered sequence with the time intervals allocated to each of the digits being at least approximately equal.

Another important object is to provide apparatus for encoding meter readings as electrical signals which can be applied to the indicators of extant meters with a minimum modification of the indicators, and which will be applicable to most if not all meters having individual dials for indicating each digit of the reading with each dial being associated with a rotatable shaft carrying a dial pointer.

Another important object of the invention is to provide apparatus of the character specified above which will cyclically read a plurality of meters.

Another object of the invention is to provide apparatus for reading multi-dial type meter indicators such that the apparatus does not impose any mechanical drag to the mechanical movement of the meter indicator in the performance of its indicator function.

Another important object is to provide apparatus which will complete a meter reading cycle at high speed so as to enjoy as much as possible the advantages of the extremely high rate of information handling capabilities of extant data processing equipment and the like.

One aspect of the invention involves in a meter of the type for cumulatively measuring and indicating the quantity of a public utility commodity consumed wherein the angular positions of a plurality of shafts are indicative of the integers of the numerical value of such quantity, the combination therewith of a set of normally closed electric switch means in association with each shaft with the number of such switch means being equal to that of the radix of the number system, means for selectively closing one of such electric switch means in accordance with the angular position of the shaft, an electric selector switch means, all of the electric switch means of all the shafts being connected in electrical parallel to each other and in electrical series to the selector switch means, and means for sequentially actuating in a predetermined order the selector switch means with respect to each of the shafts to sequentially close the selector switch means with respect to the electric switch means in a predetermined order of the latter.

Another aspect of the invention has to do with apparatus for electrically sensing the angular position of a rotatable shaft comprising an annular array of relatively fixed, two-position electric switches with each of the said switches having a normal position, rotatable means adapted for rotation with a shaft for angularly selected actuation of one of said switches to the other position thereof upon relative closing movement of such means and said array of switches, and means for relative closing and opening movement of said means and said array of switches.

Another aspect of the invention involves in apparatus for electrically sensing the annular position of a rotatable shaft, structure comprising a head mounted for movement toward and away from said shaft along a path substantially parallel to the axis of the shaft, said head having a center and a circumferentially spaced first set of electric contacts about said center that are electrically isolated from each other, said head having a second set of electric contacts carried thereby and circumferentially spaced about the center with each of the contacts of the second set being movable individually in a direction generally parallel to said axis into electrical contact with an individual contact of the first set of contacts from a normal position spaced therefrom, means electrically connecting all of said second set of contacts, an insulated electric conductor connected to each contact of the first set of contacts, said head including resilient fingers extending radially from the center thereof with said contacts of the second set of contacts being carried by said fingers, and an selector arm rotatable with the shaft and engageable with an angularly selected one of the fingers upon movement of the head toward the shaft to resiliently flex such finger and electrically engage the contact carried thereby with its associated contact of the first set of contacts.

Yet another aspect of the invention involves in combination with a plurality of integrating meters each adapted to indicate cumulative quantity consumption of distinct public utility services, wherein each of such meters is of the type including a plurality of rotatable shafts each indicative by the annular position of the value of individual integers in the numerical measuring system of the cumulative quantity, an electrical system comprising in association with the shafts of each meter of electrical means for sensing the angular position of each of said shafts, with such means associated with each of the shafts comprising an arm fixed to rotate with such shaft, a sensing head movable towards and away from said arm in a direction generally parallel to the axis of the shaft, said head having a center substantially aligned with the shaft, and a plurality of circumferentially spaced electric switch means disposed about the center of the head with the number of such switch means corresponding in number to the radix of the number system employed in indicating the numerical quantity, with each of said switch means being selectively engageable by the arm for actuation thereby on the arm being within a predetermined angular range upon movement of the head towards the shaft and the arm, whereby movement of the heads associated with various shafts are moved toward such shafts results in closure of a set of switch means that is uniquely determined by the quantity then indicated by the angular positions of the shafts, all of the electric switch means of all said meters being connected in electrical parallel to each other and in series with a master selector switch system, and means for sequentially actuating said system sequentially with respect to each meter and sequentially with respect to the shafts of each meter to sequentially close in a predetermined order all the electric switch means associated with each shaft.

An important feature of this invention resides in the only essential modification of extant meters required being the provision of an arm on extant dial pointer shaft and that such arm be exposed for engagement by the switch or sensing head, it being noted that the mechanical drag imposed on the shaft is nil when the arm is not contacted by the sensing head, and is virtually non-existent then inasmuch as the movement of the sensing head is axial with respect to the shaft and in view of the brief engagement (essentially sampling in nature) of the sensing head with the arm.

Another important feature of the invention resides in the selector switch which in effect seeks to complete a circuit sequentially through all of the switches of all the sensing heads associated with a meter, the arrangement being such that such sequential operation is performed with the very substantial rapidity with which an armature may be drawn within a solenoid.

Other objects, aspects and features of the invention not specially mentioned above will become clearly apparent during the following description of a preferred embodiment of the invention illustrated in the accompanying drawings, wherein:

Referring now to the drawings wherein like numerals designate like parts throughout the various views, the system of the invention is designated generally at 10, such meter reading and signaling system 10 being comprised of a plurality of generally similar combined meters and sensing and signaling units such as the one shown at 12 and those indicated generally in dashed outline at 14 and 16. The system also includes a main selector switch 18 of rotary character (preferably in the form of a conventional multiple pole electric timer having a conventional latching relay element that limits operation of the same to a single cycle (360° rotation) on a single energization thereof), whereby telephone equipment electrical conductors 19, 20 and 22 can be selectively coupled to selected meter combinations such as those indicated at 12, 14 and 16 in a manner to be explained.

Each of the meter combinations 12, 14 and 16 are essentially identical and actually differ one from another solely in that they pertain ordinarily to the presentation of data having to do with cumulative measurements of differing commodities or services, such as water, gas, electricity, and time adding devices such as used in determining total time usage of what is commonly known as "Pay TV" and the like. For example, the combination 12 can be such as to include water or gas consumption indicating meter, with the combinations 14 and 16 including, respectively an electric power consumption indicating meter, and time of usage indicating meter (Pay TV or the like). Any and all such services, commodities and the like, which can be or which are metered to customers, shall simply be hereinafter termed "utilities" in this specification and in the claims hereof, and the use of the term "utilities" is to be so interpreted. Since the meter combinations 12, 14 and 16 are essentially identical insofar as the present invention and its practice are concerned, a detailed description of the combination 12 will suffice for all when coupled with an explanation of the manner in which the main selector or timing switch 18 serves to selectively couple such combinations 12, 14 and 16 to a common telephone facility (which includes a source of electrical energy, and is preferably coupled to and includes a remote computer facility) illustrated diagrammatically by the block 24 labeled "TELEPHONE SYSTEM, AND CENTRAL COMPUTER SYSTEM."

Figure 2:
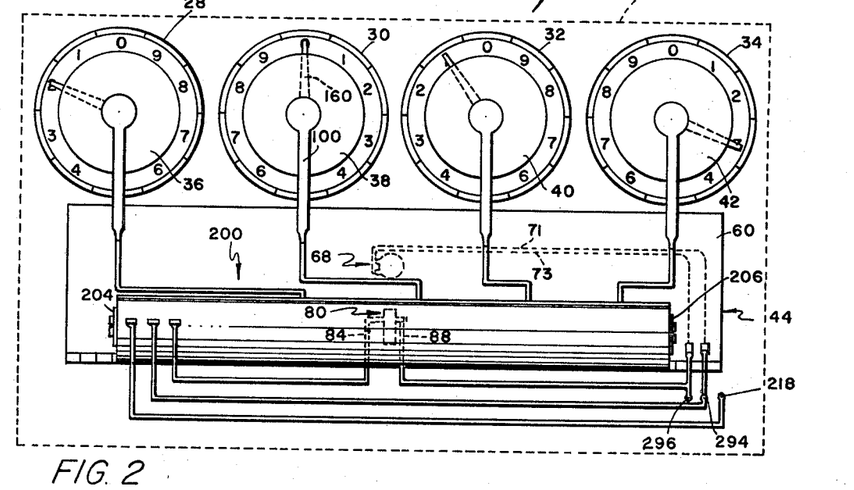
FIGURE 2 is a front elevational view of a sensing and signal producing structure as applied to a single meter.

As best shown in FIGURE 2, the meter combination 12 is comprised of a conventional utility meter indicated in dashed outline at 26, and with the digit indicating dials of such conventional utility meter 26 being indicated at 28, 30, 32 and 34. It will be understood, of course, that the meter 26 can include a greater or lesser number of digit indicating dials. It will also be noted with respect to each of the dials 28 through 34 that they bear numerical indicia of conventional character whereby a dial pointer can indicate the numerical value of the digit indicated by a particular dial. It will also be noted that the numerical value of the digit indicia is alternately clockwise and anticlockwise through the series of dials 28 through 34, and it will be understood by those skilled in the metering art that such is normally the case because of efforts to minimize the complexity of conventional gear trains connecting the pointer shafts of the various dials (to obtain driving ratios therebetween equal to the radix of the number system employed—10 being the ordinary radix) and for the further reason that such arrangement has been deemed by some as increasing the likelihood of obtaining correct meter readings on visual inspection of the dials 28 through 34.

The meter combination 12, in addition to including a conventional utility meter 26 and conventional indicating means thereof such as the dials 28 through 34. Also includes sensing heads 36, 38, 40, and 42 respectively and operatively associated with the dials 28, 30, 32 and 34, together with a common actuator means 44 for simultaneously actuating all of the sensing heads 36 through 42 from normal or inactive positions thereof into active and coacting relationship with respect to elements conventionally included in the mechanism of and specially provided for the mechanisms of the dials 28 through 34 as will be fully explained hereinafter.

Additionally, the meter combination 12 includes an electro-mechanical selector switch assembly designated generally at 46.

Inasmuch as each of the sensing heads 36 through 42 are identical to each other, and inasmuch as each of the sensing heads 36 through 42 bear essentially the same relationship to the common actuating means 44 thereof, a detailed description of the sensing head 38 and its relationship to the common actuating means 44 will suffice for the other sensing heads 36, 40 and 42.

Figure 3:
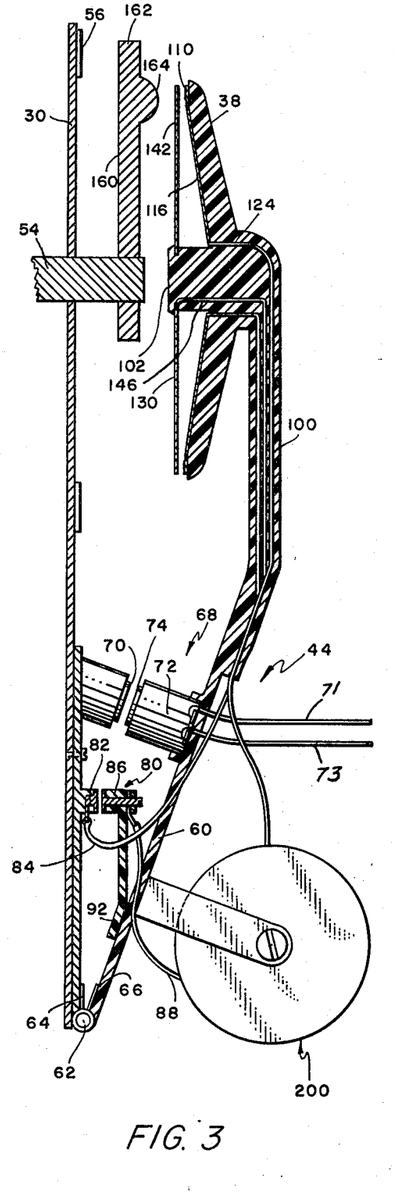
FIGURES 3 and 4 are enlarged vertical sectional views of the structure shown in FIGURE 2 through one of the sensing heads, with parts being shown in end elevation; such views respectively showing the head in normal and sensing position.
Figure 4:
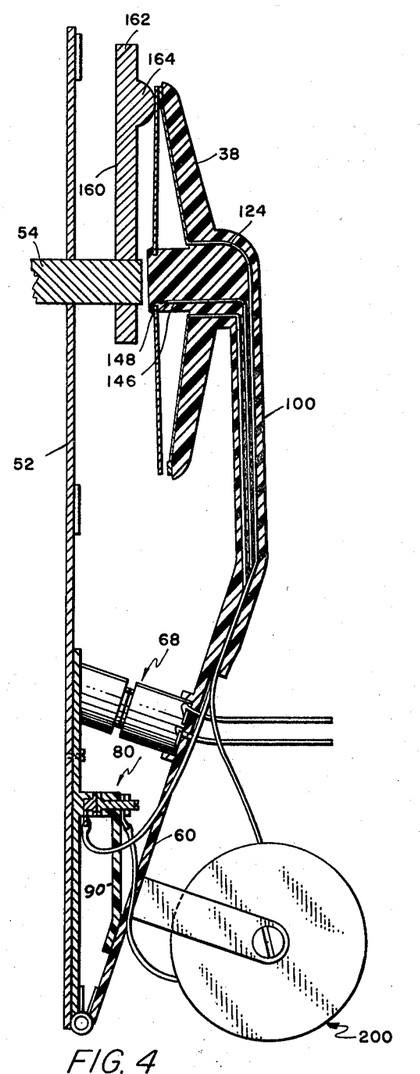

For this purpose, attention is directed to FIGURES 3 through 7, wherein the reference numeral 50 designates a plate 50 which is rigidly mounted with respect to the dials 28 through 34, and which plate 50 can be fixedly secured as shown to a common dial plate 52 through which all the pointer shafts of the dials 28 through 34 rotatably extend, such as the dial shaft 54 of the dial 30 shown in FIGURES 3 and 4 as rotatably extending toward the center of the sensing head 38.

Dial indicia of the dial 30 is indicated in FIGURES 3 and 4 at 56, the same being placed on the wall or plate 52, and it is to be noted that the annular display of the indicia 56 has a diameter substantially greater than that of the sensing head 38 whereby such indicia 56 can be viewed or visually read from a position facing toward the plate 52 about the periphery of the sensing head 38. A plate or panel 60 of generally rectangular configuration and preferably of an electrically insulative material such as a synthetic resin (Teflon, nylon and polyethylene being representative of many suitable plastics) is hinged along its lower edge as by a piano-type hinge 62 to the lower edge of the plate 50. The panel 60 is shown in FIGURE 3 in its normal angular relationship with respect to the plate 50 and a suitable stop, not shown, is provided to prevent clockwise movement of the panel 60 from the position shown thereof in FIGURE 3 with respect to the plate 50. Additionally, the hinge 62 includes a coiled wire spring incorporated therewith that includes opposite ends 64 and 66 for yieldingly urging clockwise movement of the panel 60 from the plate 50 toward the position shown of the panel 60 in FIGURE 3.

Electro-mechanical means is provided for urging the plate 60 to move in an anticlockwise direction from the position shown thereof in FIGURE 3 to that shown thereof in FIGURE 4, such electro-mechanical means being designated generally at 68 and comprising a soft iron member 70 fixed to the plate 50 and a solenoid 72 having a soft iron core or member 74, the arrangement being such that the iron members 70 and 74 are spaced apart when the panel 60 is in its normal or inactive position, and which iron members 70 and 74 abut each other as shown in FIGURE 4 when the panel 60 is in its energized position, it being appreciated that electrical energization of the solenoid 72 results in the movement of the panel 60 from the position shown in FIGURE 3 to that shown in FIGURE 4, and that upon de-energization of the coil or solenoid 72 that the panel 60 moves from the position shown in FIGURE 4 to that shown in FIGURE 3.

For a purpose that will subsequently be described, switch means designated generally at 80 is provided in the nature of a single-pole, single-throw switch that is open when the panel 60 is in its normal or inactive position and which is closed when the panel 60 is in its active position, shown in FIGURE 4. The switch means 80 includes an electrically insulated contact 82 fixed to the plate 50, the same being provided with an insulated electric conductor 84, and a movable contact 86 provided with an insulated conductor 88. The movable contact 86 is adjustably threaded through the upper and free end of an arm 90 (of resilient plastic, such as nylon) that is fixedly secured to the panel 60 at its lower end at 92 whereby the contact 86 is insulated and the contacts 82 and 86 can engage prior to engagement of the members 70 and 74 without breaking the arm 90. The threading of the contact 86 enables adjustment of the closure of the switch 80 in relation to the angular position of the panel 60 intermediate the positions of the latter shown in FIGURES 3 and 4.

The sensing head 38 is carried at the upper end of and is preferably integral with a support column 100, and the lower end of the support column 100 is fixedly secured to and is preferably integral with the upper edge of the panel 60. In any event, in the preferred construction, the sensing head 38 as well as the support column 100 are both made of electrically insulative material, it being specially preferred that such material be such as those previously indicated as suitable for the panel 60, whereby electrical conductors can be molded in or encapsulated within the sensing head 38 and its support column 100 by conventional synthetic resin molding techniques.

The sensing head 38 proper includes a central hub portion having a free end 102 that is in alignment with and which extends towards the pointer shaft 54 of the dial 50, and the sensing head 38 additionally includes a radially extending wall 104 symmetrical about the hub 102 and having the general configuration of a cone having its major end directed toward the dial 30, and such cone-shaped wall 104 has a conically tapered surface 106 on the dial side thereof that merges at its outermost extremity with an annular planar surface 108 that is in turn coterminous with the maximum radial extent of the sensing head 38.

Figures 5, 6, 7:
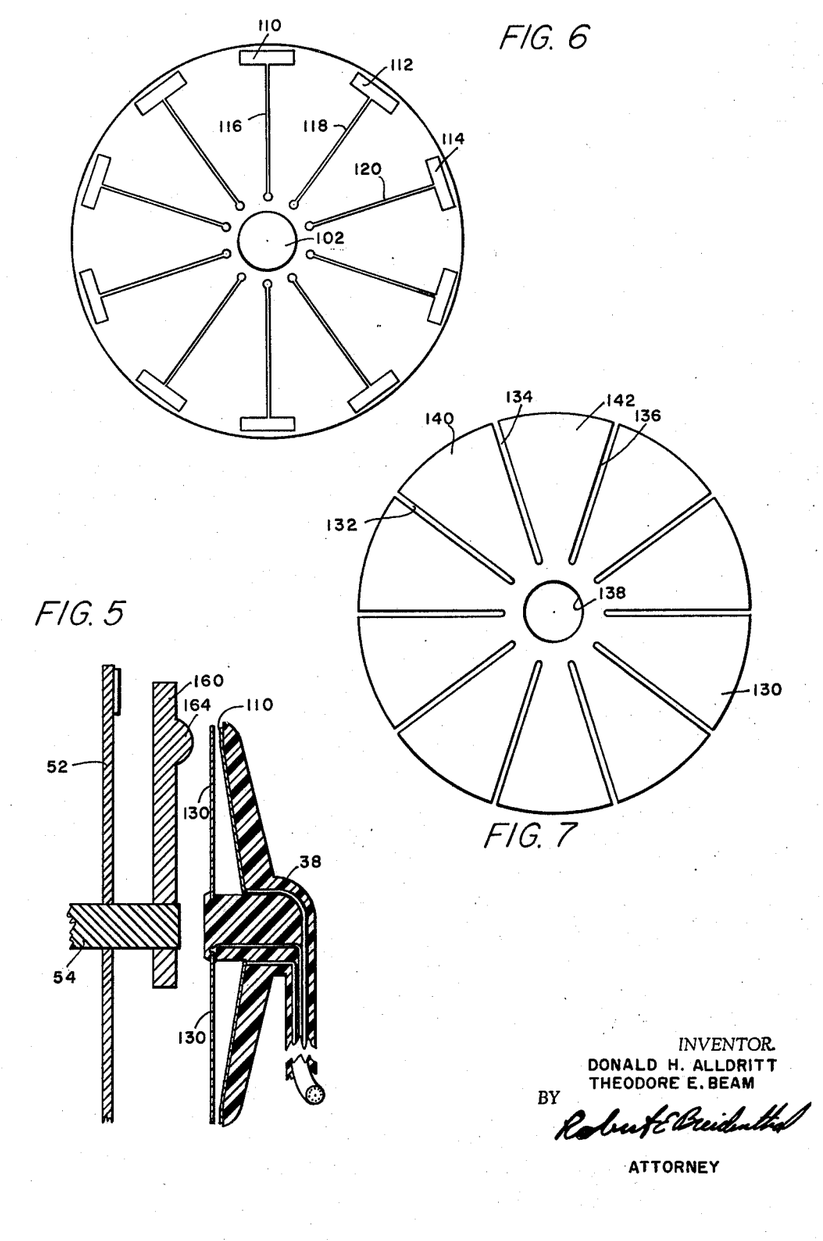
FIGURE 5 is a fragmentary sectional detail view of a sensing head and the movable meter indicating parts with which it is associated, the head being shown in its normal or retracted inactive position.
FIGURE 6 is an elevational view of the meter-side face of a sensing head with the arm engaging finger and contact disc removed.
FIGURE 7 is an elevational view of the finger and contact disc.

Referring specifically to FIGURE 6, a plurality of circumferentially spaced electrical contacts such as those indicated at 110, 112 and 114 are disposed about and secured to the flat annular surface 108, and each of the contacts 110, 112 and 114 is electrically connected to and is preferably integral with radially extending electrical conductors 116, 118 and 120, respectively, that are secured to the conical face 106 of the sensing head 38. In the preferred construction, the contacts 110 through 114 and the conductors 116 through 120 are secured to the insulative material of the sensing head 38 and formed thereon by conventional printed circuit techniques, whereby substantial economies in fabrication can be effected. The radially innermost extremities of the electrical conductors 116 through 120 such as the extremity 122 are connected to electric conductors that are preferably embedded in the electrically insulative material of the head 38 and the column 100, such as the electric conductor 124 shown connected to the extremity 122 of the conductor 116 that is embedded in the head 38 and the column 100.

It will be noted that the number of contacts 110 through 114 correspond to the number of digit indicia 56 of the dial 30, namely, 10 which is of course the radix of the number system in common usage; however, it will be evident that any numbering system having as a radix a number other than 10 could be employed without departing from the principles herein presented. For example, should the numbering system selected be the well known binary numbering system, the radix of which is two, then the number of contacts such as those indicated at 110 would only be two in number, and so forth.

The sensing head 38 additionally includes a metallic and electrically conductive plate of generally disc-like configuration which is designated at 130, the same being fixed upon the outer end portion of the hub 102 as shown in FIGURES 3 and 4.

Referring specifically to FIGURE 7, it will be seen that the plate 130 is provided with a plurality of radial slots such as those indicated at 132, 134, and 136 that extend from the outer periphery of the plate 130 to a position adjacent though spaced from a central opening 138 in the plate 130 through which the hub 102 is received and fixed nonrotatably to the plate 130. The slots 132 through 136 are such as to provide in this instance ten axially flexible and resilient, electrically conductive fingers or finger contacts such as those indicated at 140 and 142. Inasmuch as the fingers 140 and 142 are electrically conductive such fingers 140 and 142 can be deemed insofar as their radially outermost extents are concerned as movable electrical contacts. In the preferred construction, the plate 130 can be made of resilient beryllium copper. The disc or plate 130 is fixed in such angular relationship about its axis to the sensing head 38 so that the slots such as those shown at 132 through 136 bisect the angular spacing between adjacent contacts such as those indicated at 110 through 114. An electrical conductor 146 embedded in the sensing head 38 and the support column 100 thereof is electrically connected to the disc or plate 130 at 148 whereby electrical connection can be made to all the fingers such as those indicated at 140 and 142, it being obvious that all the fingers 140 and 142 of the disc 130 are electrically connected by virtue of the integral construction thereof about the opening 138.

As clearly apparent on inspection of FIGURE 5, the diameter of the plate 130 is such that the radial extents of the fingers 140 and 142 from the axis of the hub 102 of the head 38 is substantially equal to that of the radial spacing of the contacts 110 through 114 from such axis, and the axial spacing of the disc or plate 130 from the plane of the contacts 110 through 114 is such that the outermost extremities of the fingers 140 and 142 are axially spaced a slight distance from the contacts 110 through 114 when the fingers are not subjected to any external stresses; however, the outermost extremities of the fingers 140 and 142 can be axially flexed so as to electrically contact the particular contacts 110 through 114 which they overlie.

An arm 160 is fixed to the pointer shaft 54 of the dial 30 so as to rotate therewith, and the radial extent of the arm 160 is such that the same has the outer extremity 162 thereof extending beyond the radius of the head 38 so that such extremity 162 can serve the function of a pointer to be viewed against the background of the indicia 56 of the dial 30, whereby the dial reading of the dial 30 can be visually ascertained with the arm 160 serving the function of a pointer. The arm 160 is provided with a protruding portion or projection 164 having a small circumferential extent insofar as the axis of the shaft 54 is concerned, such projection 164 projecting toward the sensing head 38 and being disposed radially from the axis of the shaft 54 by an amount that is preferably slightly less than the displacement radially of the contacts 110 through 114 and the outermost extremities of the fingers 140 and 142. It will therefore be evident that during rotation of the shaft 54 the projection 164 travels a circular path that sequentially is directed toward the various fingers such as those indicated at 140 and 142 of the plate 130. It will also be noted on inspection of FIGURES 3 and 4 that when the panel 60 is in its inactive position the projection 164 is spaced from the plate 130, but that when the panel 60 is moved to its active position such as shown in FIGURE 4 the head 130 moves toward the shaft 54 to a sufficient extent that a finger such as the contact finger 142 of the plate 130 is forced against the projection 164 and caused to be flexed resiliently toward and into engagement with one of the contacts 110 through 114, such as the zero digit indicating contact 110. It will be evident that the particular one of the contacts 110 through 114 electrically engaged by the fingers 140 and 142 of the plate 130 is determined by the angular position of the rotatable pointer shaft 54. In the preferred construction, the slots 132 through 136 are so narrow in relation to the projection 164 that, excepting the circumstance of the projection 164 exactly coinciding with one of such slots, only one finger 140 through 142 will be sufficiently flexed to contact contacts 110 through 114. When, as is preferred, the dial shaft 54 is driven by Geneva-type gearing to advance the projection 164 stepwise between positions coinciding with angular centers of the fingers 140 through 142, the probability of such dual closures is rendered very improbable; however, the occurrence of such an unlikely event is, as will presently be seen, self-revealing so reliance on any false indication can be avoided. With Geneva gearing especially, this type of malfunction will ordinarily occur only with respect to the least numerical position value digit dial, and can arbitrarily be easily treated on interpretation as though only the most clockwise (or anticlockwise) closure occurred without introduction of any appreciable error.

Accordingly, the electric conductor 146 is for all practical purposes electrically connected uniquely to one of a plurality of electric conductors such as those indicated at 124, 166 and 168, respectively, connected to the contacts 110 through 114 with the basis of such selection being determined by the angular position of the pointer shaft 54 and the arm 160 rotatable therewith.

In this manner, as will be readily understood by those skilled in the art, electric conductors 124, 166 and 168 are associated with the digits of our decimal numbering system "0," "1," and "2," with electric conductors 170, 172, 174, 176, 178, 180, and 182 being respectively associated with the digits "3," "4," "5," "6," "7," "8," and "9."

The reference numeral 200 designates generally an electro-magnetic selector switch, the same comprising a housing 202 secured to the panel 60 by end brackets 204 and 206. Disposed within one end of the housing 202 is a solenoid 208 within which an armature 210 is slidingly reciprocable (the same being shown in FIGURE 8 at a position intermediate of its travel path). The armature has an enlarged end 212 which bears against a coiled compression spring 213 that normally holds the enlarged head 212 seated against an insulated, electrically conductive plate 214 through which the armature 210 slidingly extends and with which it is in continuous electrical contact. The plate or contactor washer 214 is connected by a lead 216 (see FIGURE 1) to an insulated terminal 218 on the housing 202. The end of the armature 210, which is electrically conductive is provided at its other end with a relatively fixed radial enlargement 220 having seated in an annular groove 222 thereabout a thin and resilient split ring 224 sliding contactor 224. The enlargement 220 and the ring are each electrically conductive and electrical continuity is thereby established between the sliding contact 224 and the plate or annular contact 214. The housing 202 is of electrically insulative material, such as porcelain. Bakelite, nylon, Teflon, or the like, and contains therein on the side of the annular contact 214 opposite the solenoid coil 208 a stack of alternated annular plates of insulative and conductive material, all of said plates have circular openings of identical diameter to define a cylindrical opening 230 in which the ring 224 tightly though slidingly is received for reciprocation with the armature 210 so as to engage with the conductive plates or annular terminals that in part define the continuous cylindrical opening one at a time during reciprocation of the armature 210, preferably with the axial thickness of the insulative and conductive plates being so related to the axial extent of the ring 224 being such that a greater amount of axial travel of the armature 210 occurs between the ring 224 contacting successive conductive plates (in other words, being out of contact with both) than that which occurs while the ring 224 is in continuous contact with one of the conductive plates. The reference numerals 250, 252, 254, 256, 258, 260, 262, 264, 266 and 268 designate a consecutive series of the annular plates discussed above, and are the particular plates associated with the dial 30 and head 38, it being understood that the heads 42 and 40 have similar and preceding sets of conductive plates, and the head 36 has a succeeding set of similar plates. The conductive plates 250 through 268 can be copper, for example. The reference numeral 270 is employed to designate several representative insulative plates and they can be Teflon (polytetrafluoroethylene), for example, and preferably for the reason of the low friction characteristics thereof.

Figure 9:
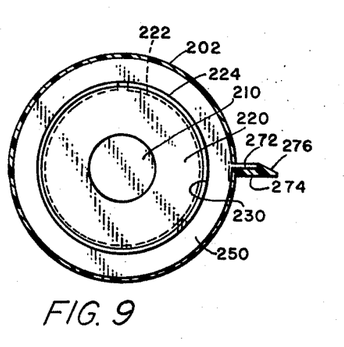
FIGURE 9 is an enlarged sectional view taken upon the plane of the section line 9—9 in FIGURE 8; and, FIGURE 10 is a fragmentary isometric detail view partly in section of the selector switch of FIGURES 8 and 9.
Figure 10:
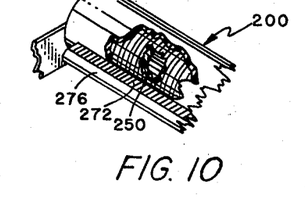

Each of the conductive plates such as 250–268 has a radially projecting ear that extends radially through and from the housing to constitute a terminal connection therefor. Such structure with respect to the plate 250 can be readily seen in FIGURES 9 and 10, the plate 250 having an integral terminal ear 272. The insulative material of the housing 202 is formed as indicated at 274 to constitute a reinforcing rib for the protruding terminals or ears such as terminal 272 having a beveled edge 276 as shown. The row of terminal ears (such as the ear 272), the rib 274 and its beveled edge 276 jointly constitute in effect a conventional multiple conductor plug for connecting the conductive plates to associated circuitry.

In this manner the plates 250 through 268 are respectively connected electrically to the previously described conductors 124 and 166 through 182, and in a similar fashion the corresponding conductors of the heads 36, 40 and 42 are connected to the selector switch 200.

For a reason to be presently described, the selector switch 200 includes three additional conductive plates, namely, a plate 280 which is the conductive plate most remote from the wiper plate 214 and plates 282 and 284 nearest the wiper plate 214. The terminals of the plates 280, 282 and 284 are electrically connected together and to the lead 146 by leads 286 and 288.

Referring again to FIGURE 1, the telephone system and central computer system 24 includes at the metered customer's telephone three terminals connected to the lead 19 (which can be at ground potential), and leads 20 and 22, which for present purposes of explanation at the moment can be assumed to be connected respectively to terminals 294, 218 and 296 by leads 300, 302 and 304 by the timer or main selector swtich means 18.

Upon establishment, by use of the systems 24, of a telephonic communication link between the remote central computer site embodied in the systems 24, (such link establishment being initiated at such remote site) and the site of the metered customer's telephone, the leads 19 and 22 (which are normally, that is in the absence of the telephonic link, de-energized) are energized, and for the purpose of the present description such energization shall be assumed to be by way of providing a positive direct current potential to the lead 22 with respect to the lead 19, the latter being at ground potential. Those skilled in the art will appreciate that such electrical energization can alternatively be by way of an alternating current potential between the leads 19 and 22 (which can if desired be obtained from the metered customer's alternating current power mains by relays included in the systems 24, for example). Such communication link establishment is accompanied by and includes establishment of an information or data transmission connection between the lead 20 and the remote computer system site.

Figure 1:
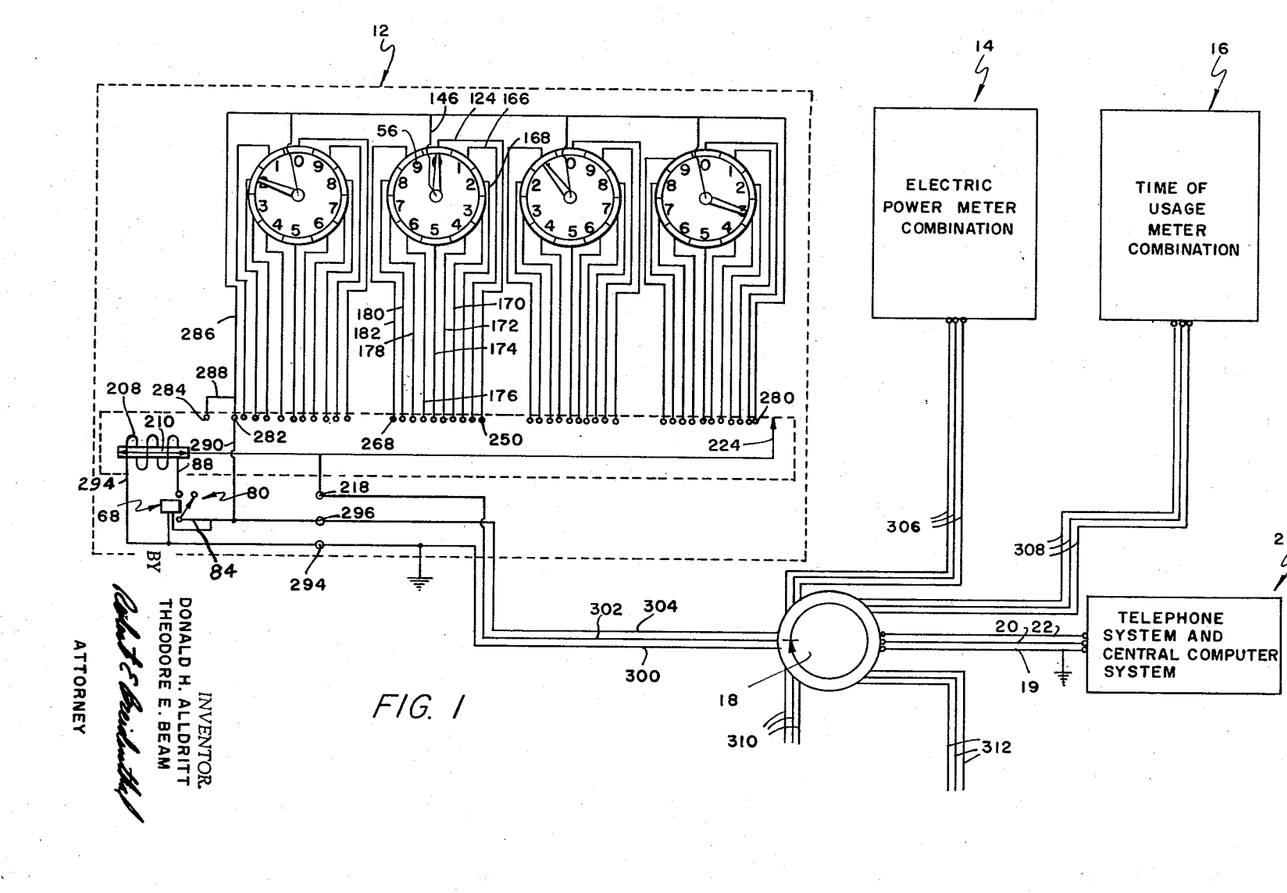
FIGURE 1 is a schematic and diagrammatic representation of the invention with all but one meter unit being illustrated in dashed outline.

What ever the character of the communications link consisting of telephone facilities encompassed in the apparatus designated in FIGURE 1 at 24 (whether copper lines, microwave equipment, multiplexing units, etc.), the signals to be transmitted from the metered customer's end of the systems 24 to the remote computer end of the systems 24 is dependent in the practice of the present invention upon the time of occurrence of electrical connections being made and broken between the lead 22 and the lead 20.

Continuing to assume that the lead 22 is continuously energized positive (throughout the reading of the meter combination 12) relative to ground potential, an electrical signal in the form of a sequence of positive pulses is produced in the lead 20 (by making and breaking electrical connection between the leads 22 and 20) for transmission from the site of the metered customer's telephone to the remote site of the computer. Obviously, if the establishment of the communication of the link involves application of alternating current electrical energy to the leads 19 and 22 at a given frequency, the making and breaking of electrical connection between the leads 22 and 20 will result not in the production of positive pulses in the lead 20 relative to the lead 19, but rather in pulse modulation of the given frequency, which type of signal will in essence include the same informational content as would have the positive pulses previously described for transmission to the remote computer site. Actually, direct current potentials are preferred in the practice of the invention unless the alternating current frequency to be empolyed is substantially in excess of the maximum pulse repetition rate resulting from making and breaking electrical connection between the leads 22 and 20. It will be evident to those skilled in the art and it is evident that it is easily within the skill of those moderately familiar with information transmission systems to include within ether or both ends (customer's and computer) of the systems 24 such modulators, demodulators, pulse shapers and reshapers as to produce at the remote computer end of the systems 24 electrical pulses coincident in time spacing with the occurrences of electrical connection being made at the metered customer's site between the leads 22 and 20 (as hereinafter described in detail), whereby the pulses produced at the computer site can be fed to the computer as input or recorded on magnetic tape for subsequent computer use.

To proceed now with a description of the production of pulses on the lead 20 by making of electrical connection between the leads 22 and 20; on initiation of the application of electrical energy to the leads 19 and 22 (by the systems 24) and hence (through the timer or selector switch 18) to the leads 300 and 304, the solenoid or coil 72 is thereupon energized to result in initiating movement of the panel 60 in an anticlockwise direction from the position shown thereof in FIGURE 3. This initiation of movement results in the following sequence of events:

(1) The heads 36 through 42 move into such coacting engagement with the dials 28 through 34 such as to cause in the case of the head 38 and the dial 30 the forcing of the finger and contact 142 into electrical engagement with the contact 110 with this occurring by the finger 142 engaging the projection 164 of the dial shaft arm 160 (for the particular position of the arm 160 indicating "zero" in this case); then upon additional angular movement of the panel 60, (2) The contacts 82 and and 86 of the switch 80 close to energize the heretofore unenergized solenoid 208 of the selector switch means 200, and upon still further anticlockwise movement of the panel 60 with accompanying resilient flexure of the arm 90 of the switch 80, (3) The iron members 70 and 74 abut and movement of the panel ceases, with the panel 60 being in the position shown in FIGURE 4.

De-energization of the leads 300 and 304 (or leads 19 and 20) results in a reversal of the above steps.

Figure 8:
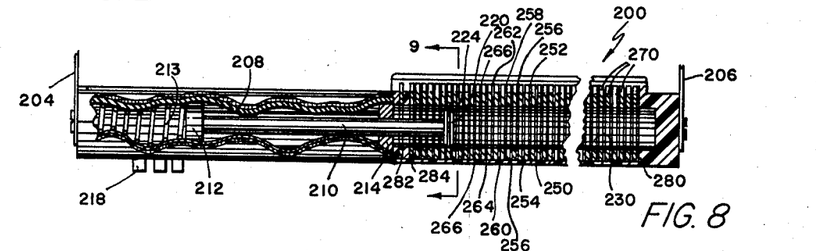
FIGURE 8 is a broken side elevational view partly in section of the electromechanical selector switch.

Prior to energization of the solenoid 208, the contactor ring 224 is disposed to the right of the contact plate 280 as seen in FIGURES 1 and 8, being resiliently held in such position by the spring 213; however, upon energization of the solenoid 208, the armature 210 is caused to be moved to the left (being drawn into the solenoid 208) as seen in FIGURES 1 and 8 against the yielding spring 213 with the result that the contactor ring 224 will move to successively electrically contact all the conductive contact plates included in the switch 200 commencing with the plate 280 and concluding with the plates 282 and 284 in such order. It is not essential that the ring 224 pass by plate 284, and the ring 224 may dwell thereon until the solenoid 208 is de-energized.

During such movement of the ring 224 between the plates 280 and 284, the ring 224 will of course have sequentially contacted in order all the conductive plates of the switch 200 associated with the digit values of 0 through 9 inclusive of dial 34, thence similarly for dial 32, thence similarly for dial 30 (the sequence of plates in this instance being 250 through 268), and thence similarly for dial 28.

It should now be noted that in each case of the ring contact 224 contacting the plates 280, 282 and 284 that electrical connection is established between the leads 304 and 302 (and hence between leads 22 and 20) by virtue of the lead 304 being connected to all of such plates 280, 282 and 284 by leads 286 and 288, with the ring contact being in turn connected to the terminal 218 of the lead 302.

Such making of connection between the leads 22 and 20 involving the plates 280 and 282 and 284 constitute the production of timing pulses indicating not only that a cycle of selector switch 200 operation has begun and ended but also furnishes on the basis of pulse time separation the exact duration of such cycle whereby the position of the ring contact 224 could at all times be calculated exactly during the interval were the velocity of the ring contact 224 constant. Even if the velocity is not constant or even quite irregular, addition accuracy of calculation to any desired degree of accuracy can be achieved by placing additional plates (not shown) such as the plates 280, 282 and 284 (similarly connected) at known positions along the travel path of the ring 224 (say, between the sets of plates for different heads), as will be evident. Such pulses as resulting from provision of addition time marker plates could be readily distinguished from other pulses as it will be seen that a single pulse is produced by the condition of each head.

While such additional time marker plates can be provided as may be deemed necessary or expedient, such additional provision is not essential for either one or both of two reasons, namely, the velocity of the ring 224 tends to be sufficiently constant in the range of ring 224 movement productive of pulses because spring 213 resistance increases as the armature 210 moves into positions such that magnetic propelling forces between the coil 208 and the armature increase and for the reason that the rate of movement of the ring 224 can be calibrated as to its position versus time, whereby accurate position calculations can be made.

Having considered the mode of production of time marker or time indexing pulses, the production of a pulse during the ring 224 sweeping the plates of the switch 200 associated with each of the heads 36 through 42 will now be considered. As such production is identical in principle with respect to each of the heads 36 through 42, it will only be necessary to explain the same in connection with the sensing head 38.

With respect to the head 38, the lead 286 connected to the time marker plates 280, 282 and 284 is connected to the disc 130 and all of the contact fingers 140 through 142 by the lead 146; however, with the pointer arm 160 in the zero indicating position as shown only the finger contact 142 of the disc 130 engages any of the contacts 110 through 114 of the head, namely, contact 142, whereby only plate 250 of all the plates 250 through 268 of the switch 200 associated with the head 38 is electrically connected to the lead 286; this being by lead 146, contacts 142 and 110 and leads 116 and 124. Should the pointer arm 160 be angularly positioned with respect to the dial 30 as occurs on different meter readings to read numbers "1," "2," "3," "4," "5," "6," "7," "8," and "9," the plates 252 through 268, respectively, will be connected to the leads 286 and 146 by the contacts of the plate or disc 130, and the contacts 112 through 114 via leads 166 through 182, respectively.

The plates 250 through 268 are progressive spaced stepwise greater and greater distances along the travel path of the ring 224 from plate 280 to the plates 282 and 284, and such distance in the case of each of such plates not only is uniquely associated with the lead 38, but also with a particular digit reading of the dial 30. Hence such distance uniquely specifies two things, namely, a digit (0–9) and the positional value of the digit as to whether of units, tens, hundreds, etc.

Referring to FIGURE 2, wherein the pointers such as the arm 160 indicate the dials 28 through 34 to respectively read the digits "2," "0," "1" and "3" representing a meter reading of the cumulatively measured utility to be 2013 unit quantities of the utility, a unique set of plates of the switch 200 (plate 250 in the case of the digit "0" in such quantity) is connected to the lead 286 and hence the lead 304 by the switches constituted by the heads 36 through 42.

Thus on the movement of the ring contact 224 on energization of the solenoid 208 previously described, the spaced set of plates of the switch uniquely characterizing by such spacing the meter reading results in the production of a corresponding unique set of pulses at the ring 224 (and lead 302) as to the time position thereof relative to the time marker pulses of the plates 280, 282 and 284 as well as such other time marker plates that may be used (such as one each uniformly spaced between the various sets of plates of the heads 36 through 42).

In other words, the arrangement is effectively the same as if a specified period of time is allocated to produce an electric signal as by a hand operated telegraph key specifying an unknown number of a known number of digits, with it being understood that such time interval is subdivided into approximately equal sub-intervals equal in number to the number of digits with each of such sub-equal secondary sub-intervals equal in number of the radix of the number system. The signal is then produced by closing the key momentary to signal that the overall time interval has commenced, and then within each sub-interval of time closing the key during only the duration of a secondary sub-interval thereof having a time position in the latter interval associated with the particular digit concerned (in other words, the first through the tenth secondary sub-intervals of a sub-interval can respectively designate digits "zero" through "nine," for example, or the reverse order can be equally employed in a mutually agreed upon code). In this regard the order of signalling digits (higher number values first or the reverse) is immaterial so long as the order is known to the producer as well as to the receiver and interpreter of the signal.

Continuing with the telegraph key viewpoint of the signal generation, the telegrapher may be thought of as operating his key while observing a watch or time indicating device upon initially signaling the commencement of the main time interval, and then closing at appropriate instants thereafter for appropriate intervals closing the key to characterize the number. The receiver having a mutual understanding of the code can determine the number by receiving the signals and noting the time of signal arrivals and their duration.

The telegrapher can if he desires conclude transmission of the number (if such procedure is mutually understood) with a final key closure to make the end of the main time interval (as measured by him), whereby the receiver can in a sense determine any error rate of his time measuring device with respect to that of the telegrapher, and thereby apply any such error rate so determined to adjust his time scale for correct interpretation of the information content of the received signal.

The operation of the equipment at the meter site thus far described is analogous to the operations of telegrapher outlined above, and the operation of the computer and/or recorders of the systems 24 remote from the meter site is analogous to the procedures (including computational) of the receiver outlined above.

As thus far described, the operation of the invention involves a computer or even a manually initiated query from a site remote from the meter combination 12 of the reading of the meter combination 12 through the use of the systems 24, which energizes the leads 19 and 22. This results in pulsed energization of the lead 20 (for transmission back to the source of the query through systems 24) from the lead 22 with the timing of the electrical pulses or intervals of energization of the lead 20 being an encoding having as its information content the desired meter combination 12 reading.

The timer switch means 18 obtains its driving energy directly from the leads 19 or 22 or indirectly therefrom by a relay switch controlled by energization of the leads 19 and 22 that in turn controls the application of energy of alternating current power mains to drive the timer 18 solely during such time that the leads 19 and 22 are energized, as will be easily understood by those active in this field of the art. Suffice to understand that the timer 18 is energized when and only when the leads 19 and 22 are energized directly or indirectly by the systems 24.

The timer 18 is essentially conventional and is cyclic in operation during a single continuous period of energization to couple the leads 19, 20 and 22 to the leads 300, 302 and 304 as previously described for a predetermined interval, thence for an essentially immediately following and non-overlapping interval to couple the leads 19, 20 and 22 to the leads 306 in a similar manner to the meter combination 14; thence to leads 308 of meter combination 16, thence to leads 312, thence to leads 310 to the point of commencement of a single timing cycle; whereupon the timer 18 stops (by an included conventional latching relay or the like) and will only initiate a new cycle upon de-energization of the leads 19 and 22 followed by re-energization of the leads 19 and 22. The sets of leads 310 and 312 are illustrated simply to illustrate how the apparatus of invention can be arranged at the customer's site to allow for convenient subsequent expansion to include automatic reading of additional future meters. It will be noted that each of the meter combinations 12, 14 and 16 are individual units that operate entirely independently of each other, having only their common connections to the timer 18 that synchronizes their operation and acts in effect as an automatic master selector switch sequentially placed in series with the paralleled selector switches 200 of the combinations 12, 14 and 16.

The time interval that the leads 19, 20 and 22 are coupled to the leads 300, 302 and 304 is predetermined to be at least as great (preferably barely exceeding) the time required for the selector switch 200 to move the ring contact 224 through to contact plate 284. As soon as the timer 18 connects leads 19, 20 and 22 to the leads 306, the connections of the leads 19, 20 and 22 to the leads 300, 302 and 304 are broken and the sensing heads of the combination return to their normal inactive positions and the ring contact 224 is restored by the spring 213 to its normal position.

The speed of operation of movement of sensing heads from their inoperative or inactive positions and the movement of the armature 210 of the switch 200 is preferably made as high as possible commensurate with the capability of the rate of information handling capability of the systems 24. In other words, the speed of operation is held to a value such that the maximum pulse repetition rate and the effects of individual pulse durations do not require an excessive band width (in achieving a suitable signal to noise ratio at the remote site) of the systems 24.

In view of the operation of the timer 18, a single query from the remote site energizing the leads 19 and 22 will result in sequential sets of pulses being produced on the lead 20 and the transmission thereof to such remote site from the meter combinations 12, and 14 and 16, as well as such other meter combinations as it may be desired to couple into the system. As soon as all such sequential sets of pulses have been received at the remote central site, the systems 24 are operated in such a manner at the central site to disconnect the systems 24 from the leads 19, 20 and 22, and the systems 24 are operated to query yet another metered customer's meter combinations, and so on.

The selector switch 200 is susceptible obviously to many variations and refinements which might be desired so as to modify the pulse output characteristics. For example, the time marker plates 280, 282 and 284 can be of substantially greater or lesser thickness than the other conductive plates so that time marker pulses have a clearly distinguishable duration. The conductive plates associated with the heads such as 250 through 268 do not necessarily have to be equally spaced, and can be for example given such spacing in relation to velocity variations of the armature 210 that the instants of engagement of the plates 250 through 268 with the contact 224 are equally spaced in time. On the other hand, velocity limiting means, not shown, such as pneumatic or hydraulic dash pots can be employed to make the velocity of the armature 210 constant for practical purposes during movement of the contact 224 through plate 280 to 284.

The meter combination 12 comprises as will be appreciated in effect an electric relay switch having a plurality of pair of contacts, and in which only one of such pairs of contacts will be actuated with respect to each other on relay solenoid energization with such one pair of contacts being selected in a manner dependent on the angular position of what might from this viewpoint be termed appropriately a rotary selector arm.

From the foregoing, the principles of the invention will be manifest to those skilled in the art. Equally manifest is the fact that numerous variations and departures can be made from the illustrated and described preferred embodiments and methods without departing from the spirit of the invention, and accordingly, attention is directed to the appended claims to ascertain the actual scope of the invention.

We claim:

1. In apparatus for electrically sensing the angular position of a rotatable shaft, structure comprising a member rotatable about an axis and adapted to be secured to a rotatable shaft for rotation therewith, said member having a portion thereof that is radially displaced from the axis thereof having less than 360° circumferential extent, a pivotally mounted sensing head mounted for movement towards and away from said member between first and second positions along (a) an arcuate travel path which is at least approximately parallel to said axis when the head is in said second position, said head having a center which is in substantial alignment with the axis of the member when the head is in its second position, said head being provided with a plurality of pressure actuated, two-position electric switch means circumferentially spaced about the center thereof movable into and out of pressure engagement with said portion of the member upon movement of the head into and from its second position for selective actuation of a subset of said switch means with such selection being determined by the angular position of the member about its axis, and said plurality of electric switch means comprising a set of electrically isolated radially extending contacts and a corresponding set of electrically connected, radially extending, resilient contact members normally spaced from the first set of contacts.

2. In apparatus for electrically sensing the annular position of a rotatable shaft, structure comprising a head mounted for movement toward and away from said shaft along a path substantially parallel to the axis of the shaft, said head having a center and a circumferentially spaced first set of electric contacts about said center that are electrically isolated from each other, said head having a second set of electric contacts carried thereby and circumferentially spaced about the center with each of the contacts of the second set being movable individually in a direction generally parallel to said axis into electrical contact with an individual contact of the first set of contacts from a normal position spaced therefrom, means electrically connecting all of said second set of contacts, an insulated electric conductor connected to each contact of the first set of contacts, said head including resilient fingers extending radially from the center thereof with said contacts of the second set of contacts being carried by said fingers, and a selector arm rotatable with the shaft and engageable with an angularly selected one of the fingers upon movement of the head toward the shaft to resiliently flex such finger and electrically engage the contact carried thereby with its associated contact of the first set of contacts.

3. The combination of claim 2, wherein said fingers and means electrically connecting the second set of contacts comprises a generally-disc-shaped resilient and metallic member having radially inwardly extending slots from the periphery thereof.

4. In measuring and integrating means of the type employed for determination of public utility services and including numerical quantity indicating means of the type including a plurality of parallel and laterally spaced rotatable shafts each indicative by the annular position thereof the value of individual digits in such numerical quantity, the combination therewith of electrical means for sensing the angular position of each of said shafts, with such means associated with each of the shafts comprising an arm fixed to rotate with such shaft, a sensing head movable towards and away from said arm in a direction generally parallel to the axis of the shaft, said head having a center substantially aligned with the shaft, and a plurality of circumferentially spaced electric switch means disposed about the center of the head with the number of such switch means corresponding in number to the radii of the number system employed in indicating the numerical quantity, with each of said switch means being selectively engageable by the arm for actuation thereby on the arm being within a predetermined angular range upon movement of the head towards the shaft and the arm, whereby movement of the heads associated with various shafts are moved toward such shafts results in closure of a set of switch means that is uniquely determined by the quantity then indicated by the angular positions of the shafts.

5. The combination of claim 4, including a selector switch associated with all of said electric switch means of all of the heads, all of said electric switch means of all the heads being connected in electric parallel to each other and in series with the selector switch, and means for sequentially actuating the selector switch with respect to the individual heads with actuation with respect to each head comprising sequentially closing in predetermined timed order all the electric switch means of such head.

6. In combination with a plurality of integrating meters each adapted to indicate cumulative quantity consumption of distinct public utility services, wherein each of such meters is of the type including a plurality of rotatable shafts each indicative by the annular position of the value of individual integers in the numerical measuring system of the cumulative quantity, an electrical system comprising in association with the shafts of each meter of electrical means for sensing the angular position of each of said shafts, with such means associated with each of the shafts comprising an arm fixed to rotate with such shaft, a sensing head movable towards and away from said arm in a direction generally parallel to the axis of the shaft, said head having a center substantially aligned with the shaft, and a plurality of circumferentially spaced electric switch means disposed about the center of the head with the number of such switch means corresponding in number to the radix of the number system employed in indicating the numerical quantity, with each of said switch means being selectively engageable by the arm for actuation thereby on the arm being within a predetermined angular range upon movement of the head towards the shaft and the arm, whereby movement of the head associated with various shafts are moved toward such shafts results in closure of a set of switch means that is uniquely determined by the quantity then indicated by the angular positions of the shafts, all of the electric switch means of all of said meters being connected in electrical parallel to each other and in series with a master selector switch system, and means for sequentially actuating said system sequentially with respect to each meter and sequentially with respect to the shafts of each meter to sequentially close in a predetermined timed order all the electric switch means associated with each shaft.

7. For use in telemetering apparatus, a relay comprising an annular array of circumferentially spaced pairs of contacts each pair having a normal relative relationship, a rotatably mounted selector arm angular registerable with a selected pair of contacts, and means including a solenoid for actuating solely the pair of contacts from their normal relative position with which the arm is in angular registry upon electrical energization of the solenoid.

References Cited

UNITED STATES PATENTS

| 2,733,008 | 1/1956 | Andrea | 340—194 |
| 2,766,445 | 10/1956 | Bland | 340—194 |
| 3,104,382 | 9/1963 | Morgan | 340—194 |

THOMAS B. HABECKER, Primary Examiner

U.S. Cl. X.R.

200—56; 340—151, 183